(12) United States Patent
Alton

(10) Patent No.: US 9,038,761 B2
(45) Date of Patent: May 26, 2015

(54) DUAL STEERING SYSTEM FOR A VEHICLE

(75) Inventor: Eisenbarth Mark Alton, Summerfield, NC (US)

(73) Assignee: VOLVO GROUP NORTH AMERICA, LLC, Greensboro, NC (US)

( * ) Notice: Subject to any disclaimer, the term of this patent is extended or adjusted under 35 U.S.C. 154(b) by 0 days.

(21) Appl. No.: 14/368,129

(22) PCT Filed: Dec. 21, 2011

(86) PCT No.: PCT/US2011/066411
§ 371 (c)(1),
(2), (4) Date: Jun. 23, 2014

(87) PCT Pub. No.: WO2013/095420
PCT Pub. Date: Jun. 27, 2013

(65) Prior Publication Data
US 2015/0014086 A1 Jan. 15, 2015

(51) Int. Cl.
*B62D 1/22* (2006.01)
*B62D 5/04* (2006.01)
*B62D 5/00* (2006.01)

(52) U.S. Cl.
CPC .. *B62D 1/22* (2013.01); *B62D 5/04* (2013.01); *B62D 5/00* (2013.01)

(58) Field of Classification Search
CPC .................................... B62D 1/22; B62D 1/02
USPC ......................................................... 180/322
See application file for complete search history.

(56) References Cited

U.S. PATENT DOCUMENTS

| 2,707,109 | A | * | 4/1955 | Umstott | ......................... 280/774 |
| 3,414,286 | A | * | 12/1968 | Muller et al. | .................. 180/409 |
| 3,814,204 | A | * | 6/1974 | Larkin | ........................ 180/89.19 |
| 3,826,328 | A | | 7/1974 | Sheppard | |
| 4,726,441 | A | | 2/1988 | Conley | |
| 4,756,552 | A | * | 7/1988 | Martinez et al. | ............... 280/774 |
| 4,815,331 | A | | 3/1989 | Land | |
| 4,911,261 | A | | 3/1990 | Conley | |
| 4,921,066 | A | * | 5/1990 | Conley | ........................... 180/322 |
| 5,435,407 | A | | 7/1995 | Renfroe | |

(Continued)

FOREIGN PATENT DOCUMENTS

DE 19642956 A1 * 4/1998
DE 10207912 A1 * 9/2003

(Continued)

OTHER PUBLICATIONS

International Search Report and Written Opinion by ISA/US of corresponding PCT/US11/66411 dated May 9, 2012.

*Primary Examiner* — Nicole Verley
(74) *Attorney, Agent, or Firm* — Michael Pruden; Martin Farrell

(57) ABSTRACT

The present invention discloses a dual steering system including a first front wheel and a second front wheel, a lateral steering linkage connecting the first and second front wheels, a first steering system with a first steering wheel and a power steering module that assists steering inputs applied to the first steering wheel, and a second steering system with a second steering wheel and a torque sensor in communication with the power steering module of the first steering system and monitoring steering inputs applied to the second steering wheel, whereby the power steering module may provide power assist to the steering inputs applied to the second steering wheel.

4 Claims, 3 Drawing Sheets

(56) References Cited

U.S. PATENT DOCUMENTS

| | | |
|---|---|---|
| 5,501,567 A | 3/1996 | Lanzdorf et al. |
| 5,653,304 A | 8/1997 | Renfroe |
| 6,276,476 B1 | 8/2001 | Farwell et al. |
| 6,641,085 B1 | 11/2003 | Delea et al. |
| 6,938,720 B2 | 9/2005 | Menjak et al. |
| 7,127,341 B2 * | 10/2006 | Whang ............ 701/43 |
| 7,308,964 B2 | 12/2007 | Hara et al. |
| 7,828,109 B2 * | 11/2010 | Chang ............ 180/400 |
| 8,695,750 B1 * | 4/2014 | Hammond et al. ............ 180/403 |
| 2005/0283291 A1 * | 12/2005 | Whang ............ 701/43 |
| 2009/0057050 A1 | 3/2009 | Shino et al. |

FOREIGN PATENT DOCUMENTS

| | | |
|---|---|---|
| ES | 2147117 A1 | 8/2000 |
| JP | 57205269 A | 12/1982 |
| WO | WO 9015747 A1 * | 12/1990 |

* cited by examiner

DUAL STEERING SYSTEM FOR A VEHICLE

FIELD OF THE INVENTION

The present invention relates to a dual steering system for a vehicle.

BACKGROUND OF THE INVENTION

Certain vehicles, including, for example, refuse vehicles and driver's education vehicles, are provided with dual steering systems that include two steering wheels, for example, a first steering wheel on the left hand side of the vehicle and a second steering wheel on the right hand side of the vehicle.

In the typical dual steering arrangement, the steering inputs applied to the first steering wheel are transferred via a pitman arm or a rack and pinion arrangement to a lateral steering linkage that interconnects the front wheels of the vehicle. In such systems, steering inputs applied to the second steering wheel are transferred to the lateral steering linkage via the same pitman arm or rack and pinion arrangement that transfers steering inputs applied to the first steering wheel to the lateral steering linkage. Typically a miter box is provided in the vehicle cab, which provides a mechanical connection between the two steering systems so that steering inputs applied to the second steering wheel are transferred to the steering column associated with the first steering wheel.

The current practice of using miter boxes to provide a mechanical connection between the left and right steering wheels presents a number of disadvantages, however. By way of example, the miter box itself takes up valuable cab space in the vehicle. Miter boxes also generate undesirable friction and compliance issues in the steering system. Miter boxes are also low volume components that come at a relatively high cost. Furthermore, there is no redundancy in such a system, and if the miter box fails at any point, any steering inputs applied to the second steering wheel will not translate into actual steering of the vehicle, thus posing a danger.

The present invention is directed to an improved dual steering system for a vehicle.

SUMMARY OF THE INVENTION

According to one embodiment of the present invention, a dual steering system for a vehicle comprises a first front wheel and a second front wheel, a lateral steering linkage, a first steering system, and a second steering system. The lateral steering linkage connects the first and second front wheels. The first steering system is provided with a first steering wheel and a power steering module that provides power assist to steering inputs applied to the first steering wheel. The second steering system is provided with a second steering wheel and a torque sensor that monitors steering inputs applied to the second steering wheel and communicates via a data communication pathway with the power steering module of the first steering system, whereby the power steering module may provide power assist to the steering inputs applied to the second steering wheel. The first steering system is connected to the lateral steering linkage whereby the first steering wheel steers the front wheels independently of the first steering system. The second steering system is connected to the lateral steering linkage whereby the second steering wheel may steer the front wheels of the vehicle independently of the first steering system in the event of failure of the power assist provided by the power steering module.

According to another embodiment of the present invention, a dual steering system for a vehicle comprises a first front wheel and a second front wheel, a lateral steering linkage, a first steering system, and a second steering system. The lateral steering linkage connects the first and second front wheels. The first steering system is provided with a first steering wheel and a first power steering module that provides power assist to steering inputs applied to the first steering wheel. The second steering system is provided with a second steering wheel and a second power steering module that provides power assist to steering inputs applied to the second steering wheel. The first power steering module is provided with a torque sensor that monitors steering inputs applied to the first steering wheel and communicates via a data communication pathway with the second power steering module of the second steering system, whereby the second power steering module may provide power assist to the steering inputs applied to the first steering wheel. The second power steering module is provided with a torque sensor that monitors steering inputs applied to the second steering wheel and communicates via the data communication pathway with the first power steering module of the first steering system, whereby the first power steering module may provide power assist to the steering inputs applied to the second steering wheel. The first steering system is connected to the lateral steering linkage whereby the first steering wheel may steer the front wheels of the vehicle independently of the second steering system in the event of failure of the power assist provided by the second power steering module. The second steering system is connected to the lateral steering linkage whereby the second steering wheel may steer the front wheels of the vehicle independently of the first steering system in the event of failure of the power assist provided by the first power steering module.

Aspects

According to one aspect of the present invention, a dual steering system for a vehicle comprises:
    a first front wheel and a second front wheel;
    a lateral steering linkage that connects the first and second front wheels;
    a first steering system provided with a first steering wheel and a power steering module that provides power assist to steering inputs applied to the first steering wheel;
    a second steering system provided with a second steering wheel and a torque sensor that monitors steering inputs applied to the second steering wheel and communicates via a data communication pathway with the power steering module of the first steering system. whereby the power steering module may provide power assist to the steering inputs applied to the second steering wheel;
    the first steering system connected to the lateral steering linkage whereby the first steering wheel steers the front wheels independently of the first steering system; and
    the second steering system connected to the lateral steering linkage whereby the second steering wheel may steer the front wheels of the vehicle independently of the first steering system in the event of failure of the power assist provided by the power steering module.

Preferably, the first and second steering systems are connected to the lateral steering linkage via first and second pitman arms, respectively.

According to another aspect of the present invention, a dual steering system for a vehicle comprises:
    a first front wheel and a second front wheel;
    a lateral steering linkage that connects the first and second front wheels;

a first steering system provided with a first steering wheel and a first power steering module that provides power assist to steering inputs applied to the first steering wheel;

a second steering system provided with a second steering wheel and a second power steering module that provides power assist to steering inputs applied to the second steering wheel;

the first power steering module provided with a torque sensor that monitors steering inputs applied to the first steering wheel and communicates via a data communication pathway with the second power steering module of the second steering system, whereby the second power steering module may provide power assist to the steering inputs applied to the first steering wheel;

the second power steering module provided with a torque sensor that monitors steering inputs applied to the second steering wheel and communicates via the data communication pathway with the first power steering module of the first steering system, whereby the first power steering module may provide power assist to the steering inputs applied to the second steering wheel;

the first steering system connected to the lateral steering linkage whereby the first steering wheel may steer the front wheels of the vehicle independently of the second steering system in the event of failure of the power assist provided by the second power steering module; and the second steering system connected to the lateral steering linkage whereby the second steering wheel may steer the front wheels of the vehicle independently of the first steering system in the event of failure of the power assist provided by the first power steering module.

Preferably, the first and second steering systems are connected to the lateral steering linkage via first and second pitman arms, respectively.

DETAILED DESCRIPTION OF THE INVENTION

Figure 1:
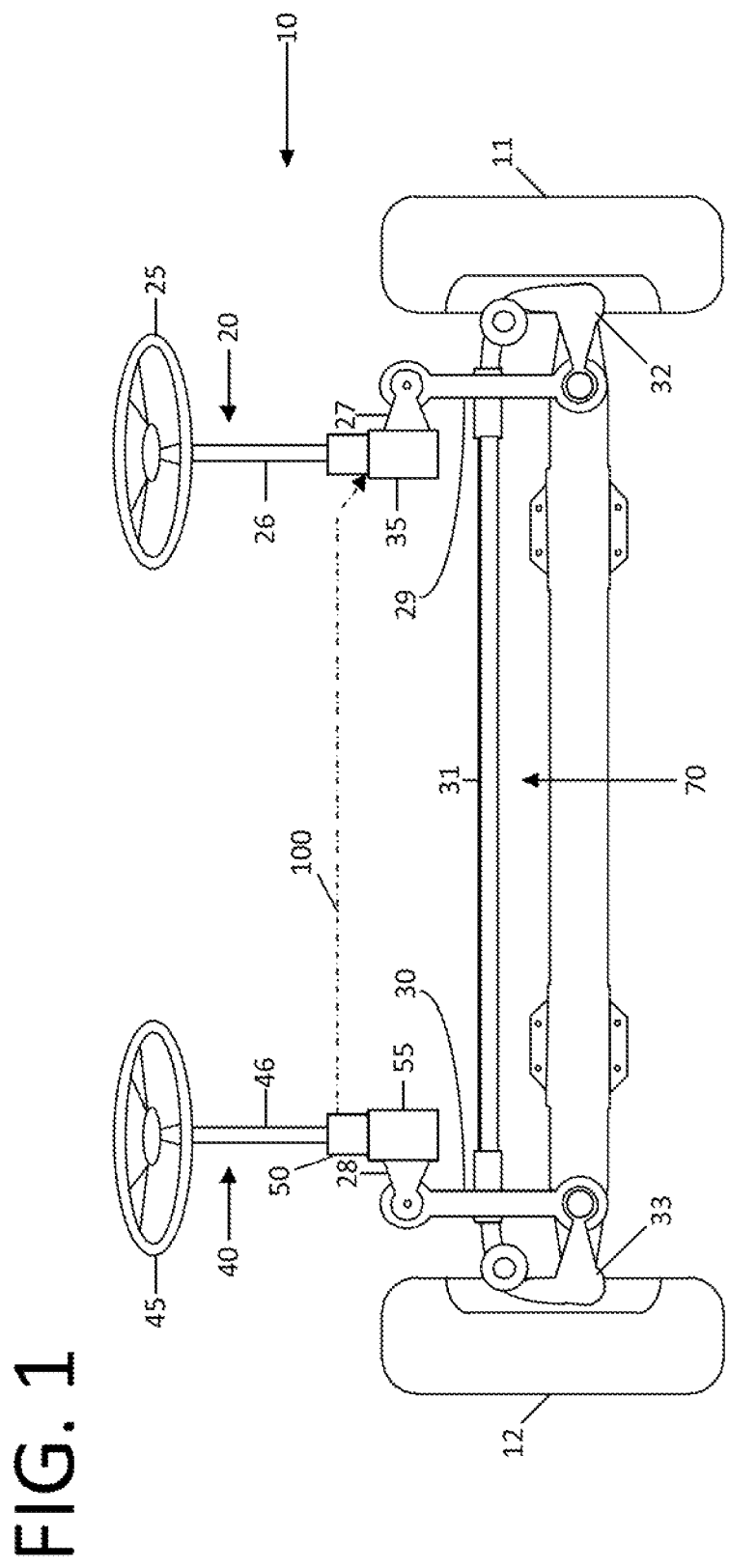
FIG. 1 depicts a schematic of a vehicle steering system according to one embodiment of the present invention.

FIG. 1 depicts a dual steering system 10 for a vehicle according to one embodiment of the present invention. As shown therein, the dual steering system 10 is provided with a first steering system 20 and a second steering system 40.

As shown in FIG. 1, the first steering system 20 is provided with a First steering wheel 25, a first steering column 26 and a power steering module 35. Also shown in FIG. I, the second steering system 40 is provided with a second steering wheel 45, a second steering column 46, a torque sensor 50, and a steering box 55.

According to one aspect of the present embodiment, each steering system 20, 40 is capable of independently steering the front wheels 11, 12 of the vehicle. According to another aspect of the present embodiment, the first steering system 20 is configured to steer the front wheels 11, 12 of the vehicle independently of the second steering system 40. According to yet another aspect of the present embodiment, the second steering system 40 is configured to steer the front wheels 11, 12 of the vehicle independently of the first steering system 40.

Referring now to FIG. 1, as shown, the first steering system 20 is connected to a lateral steering linkage 70 that interconnects the front wheels 11, 12 of the vehicle. As shown, in the present embodiment, the first steering system 20 may connect to the lateral steering linkage 70 via a first pitman arm 27 and first drag link 29 and the lateral steering linkage 70 may be provided with a tie rod 31 and first and second steer rods 32, 33. Those of ordinary skill in the art will appreciate that as the first steering wheel 25 is rotated, a worm gear of the power steering module 35 moves the first pitman arm 27 connected to the drag link 29 to cause the front wheels 11, 12 to turn in conventional fashion. Furthermore, although the power steering module 35 shown is a worm and sector type, those of ordinary skill in the art will appreciate that it is within the scope of the present invention to utilize any type of power steering module.

Referring now to FIG. 1, as shown, the second steering system 40 is connected to the lateral steering linkage 70 that interconnects the front wheels 11, 12 of the vehicle. As shown, the second steering system 40 may connect to the lateral steering linkage 70 via a second pitman arm 28 and a second drag link 30. Those of ordinary skill in the art will appreciate that as the second steering wheel 45 is rotated, the steering box 55 moves the pitman arm 28 connected to the second drag line 30, which causes the front wheels 11, 12 to turn in conventional fashion.

According to one aspect of the present embodiment, the first steering system 20 is configured to provide power steering assist to the second steering system 40. According to another aspect of the present embodiment, the power steering module 35 of the first steering system 20 is configured to provide power assist to the steering inputs applied to the second steering wheel 45.

As shown in FIG. 1, the torque sensor 50 of the second steering system 40 monitors the position of the second steering wheel 45 and the torque applied to the second steering wheel 45 and communicates via data communication pathway 100 with the power steering module 35. Those of ordinary skill in the art will appreciate that the torque sensor 50 or power steering module 35 are associated with one or more electronics that processes the readings of the torque sensor 50 in order to determine the direction and amount of power assist to be provided by the power steering module 35 in response to steering inputs applied to the second steering wheel 45.

Advantageously, in the event of a failure of a component of the second steering system 40 or first steering system 20 that prevents the power steering module 35 from assisting the second steering system 40, the second steering system 40 is capable of steering the front wheels 11, 12 of the vehicle independently of the first steering system 40, albeit manually and without power steering assistance, as previously discussed.

Figure 2:
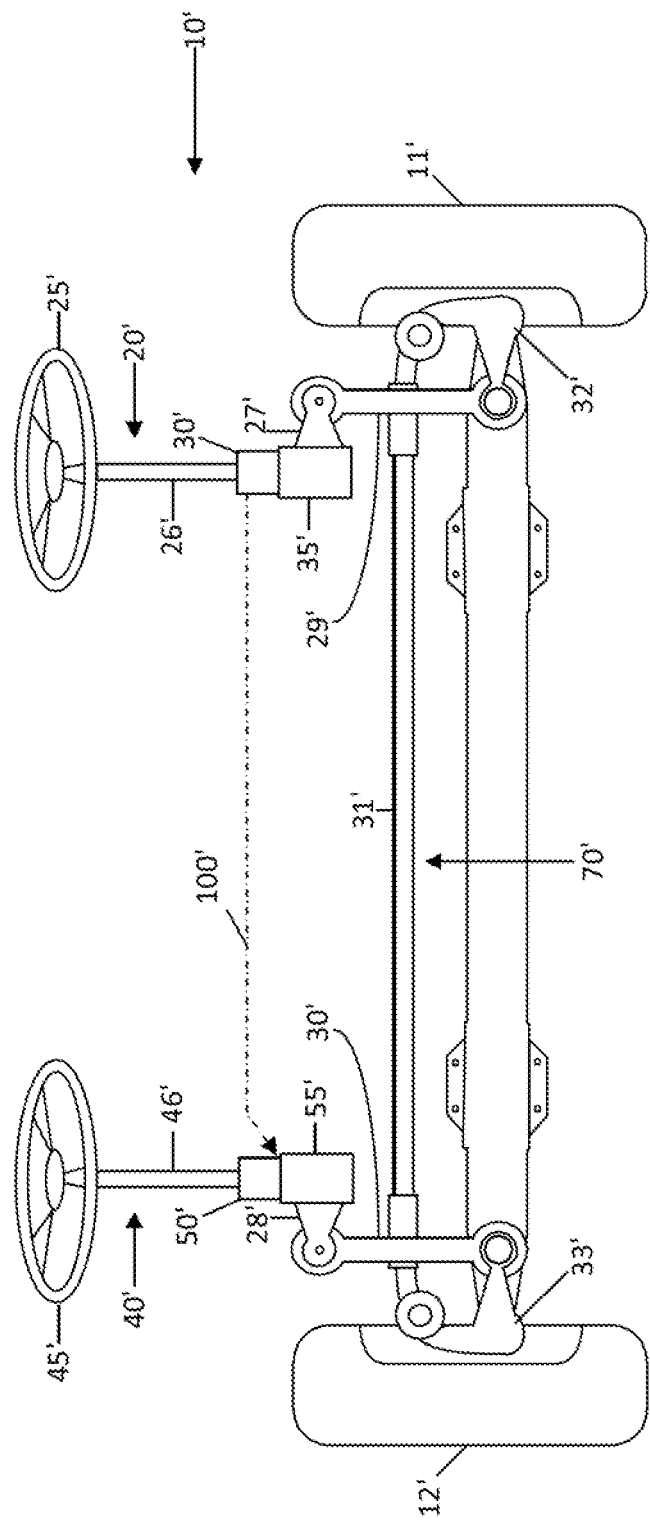
FIG. 2 depicts a schematic of a vehicle steering system according to one embodiment of the present invention.
Figure 3:
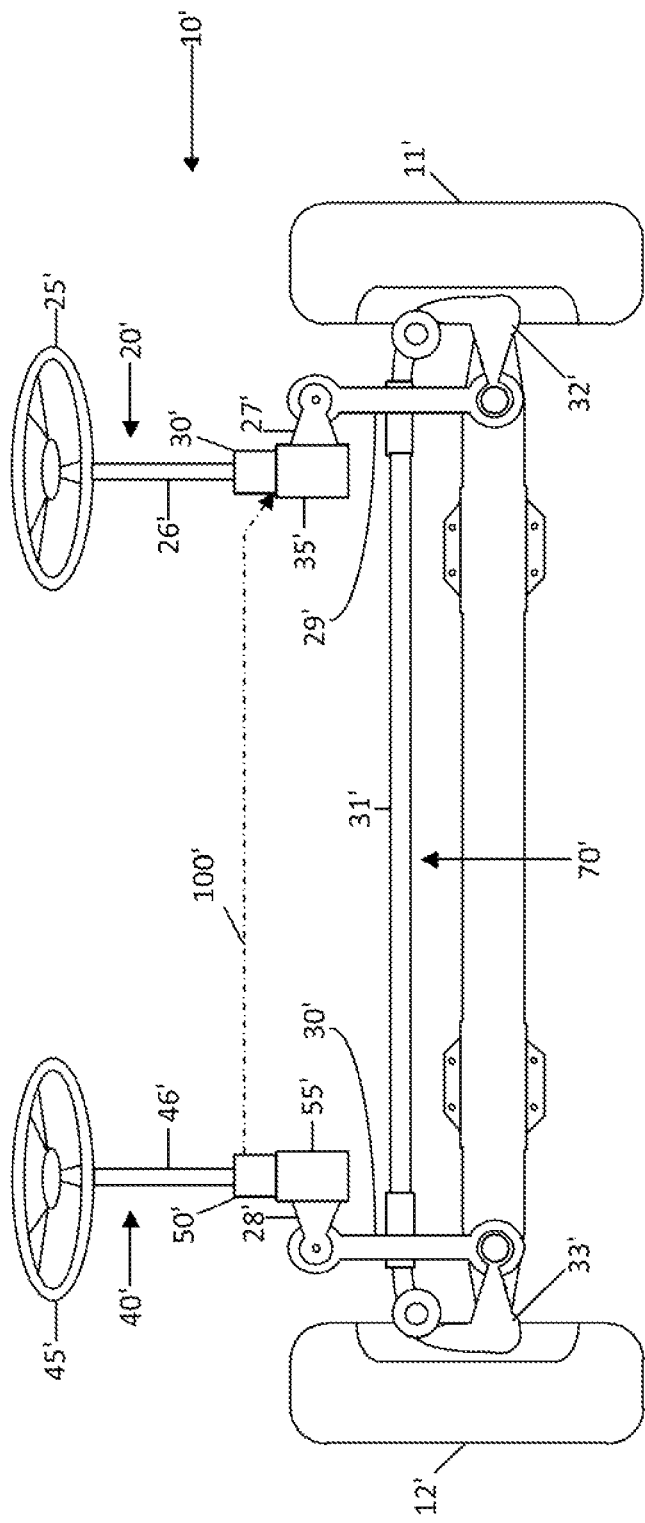
FIG. 3 depicts a schematic of a vehicle steering system according to one embodiment of the present invention.

Turning now to FIGS. 2 and 3, a dual steering system 10' according to another embodiment is depicted. The embodiment shown in FIGS. 2 and 3 is similar to the embodiment shown in FIG. I and includes similar reference numbers, which denote similar components as described with respect to the embodiment shown in FIG. I. As shown therein, the dual steering system 10' is provided with a first steering system 20' and a second steering system 40'.

As shown in FIGS. 2 and 3, the first steering system 20' is provided with a first steering wheel 25', a first steering column 26' and a first power steering module 35'. Also shown in FIGS. 2 and 3, the second steering system 40' is provided with a second steering wheel 45', a second steering column 46', a second power steering module 55'. Accordingly, in the present embodiment, each of the first and second steering systems 20', 40' are provided with a power steering module 35', 55', respectively.

According to one aspect of the present embodiment, each steering system 20', 40' is capable of independently steering the front wheels 11', 12' of the vehicle. According to another aspect of the present embodiment, the first steering system 20' is configured to steer the front wheels 11', 12' of the vehicle independently of the second steering system 40'. According to yet another aspect of the present embodiment, the second steering system 40' is configured to steer the front wheels 11', 12' of the vehicle independently of the first steering system 40'.

Referring now to FIGS. 2-3, as shown, the first steering system 20' is connected to a lateral steering linkage 70' that interconnects the front wheels 11', 12' of the vehicle. As shown, in the present embodiment, the first steering system 20' may connect to the lateral steering linkage 70' via a first pitman arm 27 and a first drag link 29 and the lateral steering linkage 70 may be provided with a tie rod 31' and first and second steer rods 32', 33'. Those of ordinary skill in the art will appreciate that as the first steering wheel 25' is rotated, a worm gear of the power steering module 35' moves the pitman 27' connected to the first drag link to cause the front wheels 11', 12' to turn in conventional fashion. Furthermore, although the power steering module 35' shown is a worm and sector type, those of ordinary skill in the art will appreciate that it is within the scope of the present invention to utilize any type of power steering module.

Referring now to FIGS. 2-3, as shown, the second steering system 40' is connected to a lateral steering linkage 70' that interconnects the front wheels 11', 12' of the vehicle. As shown, in the present embodiment, the second steering system 40' may connect to the lateral steering linkage 70' via a second pitman arm 28' and a second drag link 30'. Those of ordinary skill in the art will appreciate that as the second steering wheel 45' is rotated, a worm gear of the power steering module 35' moves the pitman arm 28' connected to the second drag link 30' to cause the front wheels 11', 12' to turn in conventional fashion. Furthermore, although the power steering module 55' shown is a worm and sector type, those of ordinary skill in the art will appreciate that it is within the scope of the present invention to utilize any type of power steering module.

According to one aspect of the present embodiment, each steering system 20', 40' is configured to provide power steering assist to the other steering system 20', 40'. According to another aspect of the present embodiment, the first steering system 20' is configured to provide power assist to the second steering system 40'. According to another aspect of the present embodiment, the power steering module 35' of the first steering system 20' is configured to provide power assist to the steering inputs applied to the second steering wheel 45'. According to yet another aspect of the present embodiment, the second steering system 40' is configured to provide power assist to the first steering system 20'. According to another aspect of the present embodiment, the power steering module 55' of the second steering system 40' is configured to provide power assist to the steering inputs applied to the first steering wheel 25'.

As shown in FIG. 2, the power assist module 35' of the first steering system 20' includes a torque sensor 30' that monitors the position of the first steering wheel 25' and the torque applied to the first steering wheel 25' and communicates via data communication pathway 100' with the second power steering module 55' of the second steering system 40'. Those of ordinary skill in the art will appreciate that the torque sensor 30' or power steering module 55' are associated with one or more electronics that process the readings of the torque sensor 30' in order to determine the direction of power assist and the amount of power assist to be provided by the second power steering module 55' in response to inputs applied to the first steering wheel 25'.

Also shown in FIG. 3, the power assist module 55' of the second steering system 40' includes a torque sensor 50' that monitors the position of the second steering wheel 45' and the torque applied to the second steering wheel 45' and communicates via data communication pathway 100' with the first power steering module 35' of the first steering system 20'. Those of ordinary skill in the art will appreciate that the torque sensor 50' or power steering module 35' are associated with one or more electronics that process the readings of the torque sensor 50' in order to determine the direction of power assist and the amount of power assist to be provided by the first power steering module 35' in response to inputs applied to the second steering wheel 45'.

Advantageously, in the event of a failure of a component of the first steering system 20' or second steering system 40' that prevents the first power steering module 35' from providing power steering assistance in response to inputs applied to the first steering wheel 25' or the second steering wheel 45, power assistance may still be provided via the second power steering module 55'. Advantageously, in the event of a failure of a component of the first steering system 20 or second steering system 40 that prevents the second power steering module 55' from providing power steering assistance to response to inputs applied to the first steering wheel 25' or the second steering wheel 45, power assistance may still be provided via the first power steering module 55'. Advantageously, in the event of a failure of a component of the first steering system 20 or second steering system 40 that prevents the first power steering module 35' and second power steering module 55' from providing power steering assistance, the first and second steering systems 20', 40' are each capable of steering the front wheels 11, 12 of the vehicle independently of the other steering system 40', 20', respectively, albeit manually and without power steering assistance, as previously discussed.

The present description depicts specific examples to teach those skilled in the art how to make and use the best mode of the invention. For the purpose of teaching inventive principles, some conventional aspects have been simplified or omitted. The detailed descriptions of the above embodiments are not exhaustive descriptions of all embodiments contemplated by the inventors to be within the scope of the invention. By way of example, and not limitation, although the dual steering systems 10, 10' depicted in FIGS. 1-3 are shown provided with pitman arms 27, 27' and 28, 28' that connect to lateral steering linkages 70 and 70' provided with a tie rods 31, 31' and first and second steer rods 32, 33 and 32', 33', in alternative embodiments, the steering systems may be of alternative types, including of the rack and pinion type.

Those skilled in the art will appreciate variations from these examples that fall within the scope of the invention. Persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

I claim:

1. A dual steering system for a vehicle, comprising:
a first front wheel and a second front wheel;
a lateral steering linkage that connects the first and second front wheels;
a first steering system provided with a first steering wheel and a power steering module that provides power assist to steering inputs applied to the first steering wheel;
a second steering system provided with a second steering wheel and a torque sensor that monitors steering inputs applied to the second steering wheel and communicates via a data communication pathway with the power steering module of the first steering system, whereby the power steering module may provide power assist to the steering inputs applied to the second steering wheel;
the first steering system connected to the lateral steering linkage whereby the first steering wheel steers the front wheels independently of the second steering system; and
the second steering system connected to the lateral steering linkage whereby the second steering wheel may steer the front wheels of the vehicle independently of the first steering system in the event of failure of the power assist provided by the power steering module.

2. The dual steering system for a vehicle according to claim 1, wherein the first and second steering systems are connected to the lateral steering linkage via first and second pitman arms, respectively.

3. A dual steering system for a vehicle, comprising:
a first front wheel and a second front wheel;
a lateral steering linkage that connects the first and second front wheels;
a first steering system provided with a first steering wheel and a first power steering module that provides power assist to steering inputs applied to the first steering wheel;
a second steering system provided with a second steering wheel and a second power steering module that provides power assist to steering inputs applied to the second steering wheel;
the first power steering module provided with a torque sensor that monitors steering inputs applied to the first steering wheel and communicates via a data communication pathway with the second power steering module of the second steering system, whereby the second power steering module may provide power assist to the steering inputs applied to the first steering wheel;
the second power steering module provided with a torque sensor that monitors steering inputs applied to the second steering wheel and communicates via the data communication pathway with the first power steering module of the first steering system, whereby the first power steering module may provide power assist to the steering inputs applied to the second steering wheel;
the first steering system connected to the lateral steering linkage whereby the first steering wheel may steer the front wheels of the vehicle independently of the second steering system in the event of failure of the power assist provided by the second power steering module; and
the second steering system connected to the lateral steering linkage whereby the second steering wheel may steer the front wheels of the vehicle independently of the first steering system in the event of failure of the power assist provided by the first power steering module.

4. The dual steering system for a vehicle according to claim 3, wherein the first and second steering systems are connected to the lateral steering linkage via first and second pitman arms, respectively.

* * * * *